(No Model.)
A. W. ENGEL.
GAGE FOR RINGS.
No. 436,972. Patented Sept. 23, 1890.
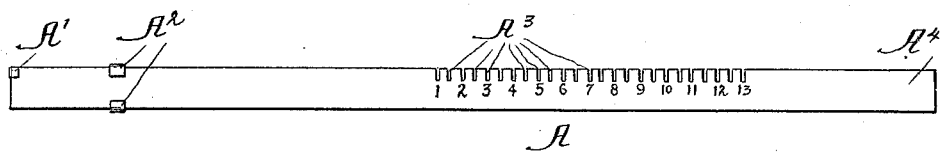
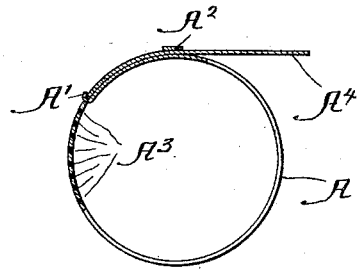
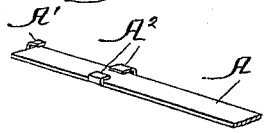
Witnesses:
Jean Elliott
Julia Usler
Inventor
Albert W. Engel
By Burton & Burton
Attorney

UNITED STATES PATENT OFFICE.

ALBERT W. ENGEL, OF CHICAGO, ILLINOIS.

GAGE FOR RINGS.

SPECIFICATION forming part of Letters Patent No. 436,972, dated September 23, 1890.

Application filed June 19, 1890. Serial No. 355,923. (No model.)

*To all whom it may concern:*

Be it known that I, ALBERT W. ENGEL, a citizen of the United States, residing at Chicago, county of Cook, and State of Illinois, have invented certain new and useful Improvements in a Ring-Scale, which is fully set forth in the following specification, reference being had to the accompanying drawings, forming a part thereof.

The purpose of this invention is to provide a convenient device for taking measurement for finger-rings, a specific purpose being to make the device adapted to be sent out by jewelers or manufacturers by mail to their customers or persons of whom they desire to solicit custom, so that such customers may take such measurement and transmit their orders, and with a view to adapting the device for such use cheapness and compactness are essential characteristics.

In the drawings, Figure 1 represents a plan view of my ring-scale stretched out full length. Fig. 2 is a partly sectional side elevation of the same coiled as in position for taking the measurement of the finger. Fig. 3 is a perspective detail of the clasping device by which it is retained coiled. All these figures are enlarged to double the actual size in each dimension.

My device consists of a flexible metal tape $A$, having at one end a small hook formed by a projection $A'$ of the same material at the end of the tape, said projection being folded back over the body of the tape, forming the hook, whose end stands out from the surface a distance equal to the thickness of the metal and a little more. The tape has also at a short distance from the end which has the hook $A'$ two lateral hooks $A^2 A^2$, formed by lateral projections folded inwardly over the tape, forming a clasp to receive the other end of the tape, as hereinafter described. For a distance from the end having the hook $A'$, equal to the circumference of the smallest size of ring which the scale is designed to measure, the tape is plain except as to the clasping-hooks $A^2$ mentioned; but beyond the limit of that distance for a distance equal to the difference of the circumference of the smallest and largest sizes which the scale is adapted to measure the edge of the scale is provided with notches $A^3 A^3$ at intervals equal to the minimum difference of size which it is desirable to measure. The distances of these notches, respectively, from the hook $A'$ corresponds to the different sizes of rings according to any standard gage among dealers and are numbered accordingly. The scale indicated on the drawings is that of the American standard gage, numbered at alternate notches from one to thirteen, the intervening notches denoting half-sizes either with or without number for those half-sizes imprinted on the scale.

This device being made, as above stated, of flexible metal is furnished in a straight tape, as illustrated in the drawings, adapted to be sent through the mail, and will be used for taking measurement by coiling it upon itself in the manner shown in Fig. 2, the plain end $A^4$ being inserted under the clasp-hooks $A^2$, and the coil thus formed being thus placed upon the finger and the end $A^4$ drawn up through the clasp-hooks until the coil fits the finger as it is desired the ring to fit, the hook $A'$ being then lodged in the nearest notch $A^3$ of the scale. The number corresponding to said notch will then indicate the size of ring to be ordered, since it will measure the length of the portion of the tape which is necessary to encircle the finger.

I claim—

1. A ring-scale or device for measuring for finger-rings, which consists of a flexible metal tape having the hook $A'$ and the notches $A^3$, adapted to receive said hook, the distance of the notches from the hook corresponding to a scale for measurement for finger-rings, substantially as set forth.

2. A ring-scale or device for measuring for finger-rings, which consists of a flexible metal tape having the hook $A'$ and the notches $A^3$, adapted to receive said hook, the distance of the notches from the hook corresponding to a scale for measurement for finger-rings, the numbers of said scale being marked upon the tape at the notches respectively, substantially as set forth.

3. A ring-scale for taking measurement for finger-rings, consisting of a flexible tape A, having the hook A' and the scale-notches A³, and having the clasp-hooks A² at a short distance from the hook A', adapted to receive the opposite end of the tape, substantially as set forth.

In testimony whereof I have hereunto set my hand, this 16th day of June, 1890, at Chicago, Illinois.

ALBERT W. ENGEL.

Witnesses:
   CHAS. S. BURTON,
   JEAN ELLIOTT.